United States Patent [19]

Carlock et al.

[11] Patent Number: 5,377,311
[45] Date of Patent: Dec. 27, 1994

[54] FAST PRINTER DATA STREAM CONVERSION WITH CONSTRAINED MEMORY

[75] Inventors: James R. Carlock, Niwot; Leonard C. Lahey, Boulder; Michael G. Lotz, Louisville; Arthur R. Roberts, Boulder, all of Colo.

[73] Assignee: International Business Machines Corporation, Armonk, N.Y.

[21] Appl. No.: 33,707

[22] Filed: Mar. 16, 1993

[51] Int. Cl.5 .............................................. G06F 15/00
[52] U.S. Cl. .................................... 395/115; 395/114; 395/116
[58] Field of Search ................ 395/102, 109, 110, 112, 395/116, 147, 148, 149, 159, 161, 200, 275, 800, 156, 114, 115

[56] References Cited

U.S. PATENT DOCUMENTS 4,651,278 3/1987 Herzog et al. ...................... 364/900
4,969,093 11/1990 Barker et al. ...................... 364/900
5,157,765 10/1992 Birk et al. ............................ 395/163

*Primary Examiner*—Dale M. Shaw
*Assistant Examiner*—Ulka Chauhan
*Attorney, Agent, or Firm*—Carl M. Wright; Saul A. Seinberg

[57] ABSTRACT

Use of a single pass print data stream conversion process when sufficient memory is available to store all the page data to be printed and reversion to a double pass conversion when insufficient memory is available. Scanning of the input data stream, storing the page data, and downloading the resource data to the printer continues so long as sufficient memory to store the page data is available. If the available memory is filled before the entire page is scanned, the stored page data is discarded. The scanning continues to download the resource data but the page data is no longer stored. When the page has been completely scanned, the scanning is restarted at the beginning of the page, downloading the page data to the printer and discarding the resource data during the second scan.

5 Claims, 4 Drawing Sheets

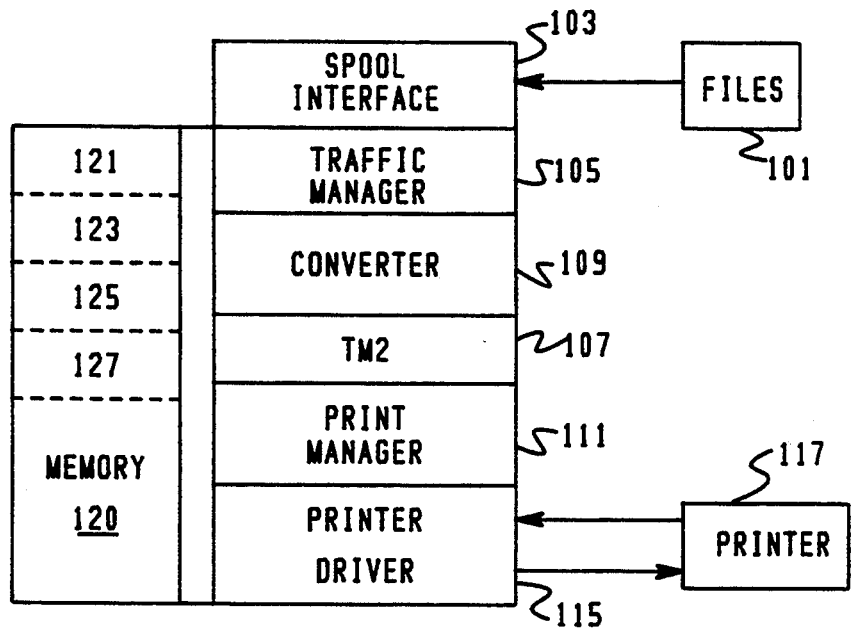
FIG. 1
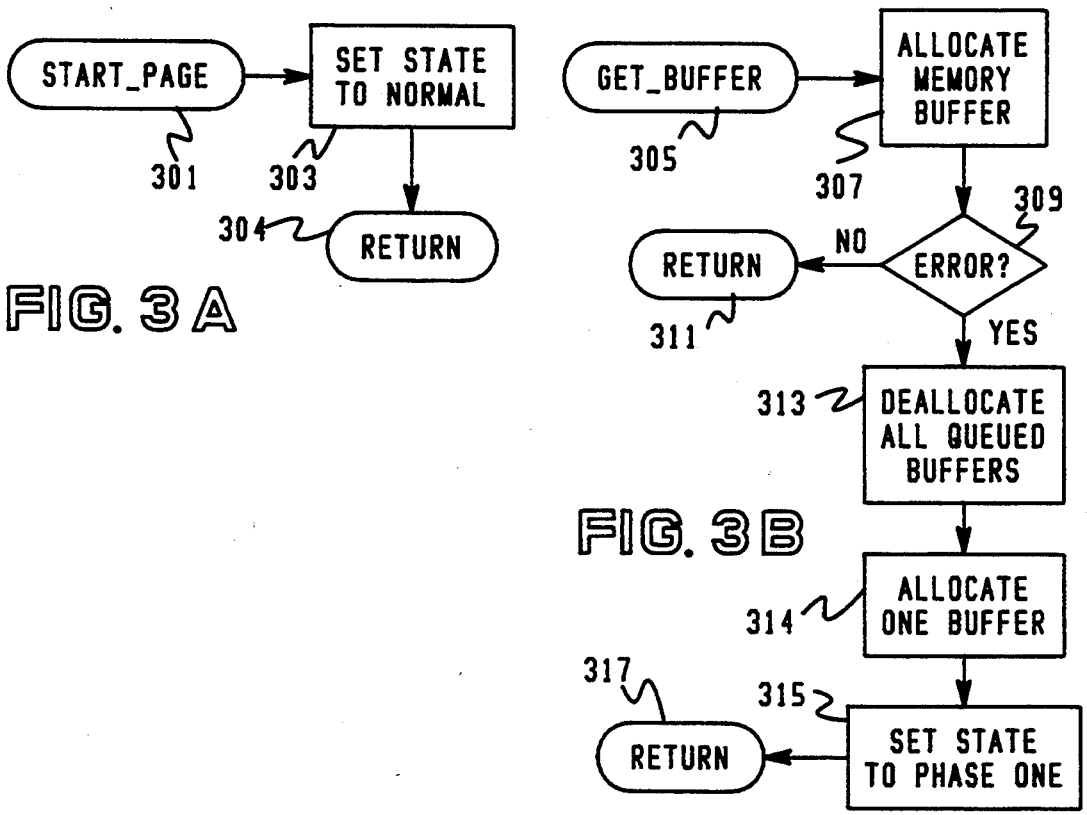
FIG. 3A
FIG. 3B

FAST PRINTER DATA STREAM CONVERSION WITH CONSTRAINED MEMORY

DOCUMENTS INCORPORATED BY REFERENCE

U.S. Pat. No. 4,651,278 to Herzog et al, and assigned to the same assignee as this application, is hereby incorporated by reference.

BACKGROUND AND SUMMARY OF THE INVENTION

This invention relates to converting and downloading a printer data stream in one format to a printer specific format and particularly to printer data stream conversion where the available memory is limited.

Printer input data supplied by the intelligent printer data streams (IPDS), ASCII data streams, and others have inherent differences that make a one-pass conversion from one format to another difficult. If necessary to implement conversions with two-pass designs, the associated printer drivers may not be able to supply modern, high speed printers with print data fast enough to utilize the full printer speed capability.

For IPDS, all font and other printer resources required for a page must be loaded into the printer before any page text is loaded. In ASCII data streams, however, font requirements may be identified anywhere in a page. For example, emphasized printing (which requires a special font to be loaded into the printer) is turned on by ASCII control characters at the beginning of the text to be emphasized and turned off by another ASCII control character at the end of the text to be emphasized. This causes problems when converting to IPDS since all the fonts must be converted to IPDS and downloaded to the printer before any IPDS page data is downloaded.

A two-pass process is usually used for such conversions. A first pass scans the ASCII data stream and downloads the font and resource information. A second pass converts and downloads the page data to be printed. Two-pass processes, however, degrade the page output rate of high speed printers by always requiring two scans of the input data stream.

A one-pass conversion process requires sufficient memory capacity to store all the data to be printed on a page. For complex pages which may contain large, detailed images, considerable memory capacity is involved. For simple applications, as an example, at a resolution of 480 pels per inch, an 8½×11 -inch page requires approximately 2.7 million bytes of storage. At 600 pels per inch, approximately 4.2 million bytes are required. These requirements are increased by other considerations. Small processors, e.g., personal computers or workstations, have smaller memory capacity than large, mainframe host computers and may not be able to store an entire page of print data Printer data storage in the prior art is characterized by U.S. Pat. No. 5,129,050 which discloses reassignment of memory within a printer where font storage is assigned a priority lower than print data so that the latter can overlay the storage area of the former.

The placement of print or page data in a printer storage according to whether the fonts required are stored or not in the printer is disclosed in U.S. Pat. No. 5,113,355.

U.S. Pat. No. 4,745,560 discloses a raster scan page memory selecting fonts according to the position of a cursor in the page. U.S. Pat. Nos. 5,001,653; 4,627,749; 5,136,688; 4,694,405; 5,025,397; 4,954,968; and 4,881,180 disclose page composing systems, some with provision for including images. While suited to the purpose to which they are directed, all depend on having sufficient memory available to accomplish their purpose and do not therefore address the problem of operating in an environment where memory may be limited, e.g., in the use of small processor systems for composing pages.

In accordance with the invention, a page in a print data stream in a first format is scanned and resource data for controlling the printer and page data to be printed are converted to a second format. The page data is stored and the resource data is transferred to the printer. When the page is completely scanned, the page data is moved to the printer. If insufficient memory is available to store all the page data, the page data is discarded and not saved during the rest of the page scanning, but the resource data is transferred. At the end of the page, the page is rescanned while the page data sent to the printer and the resource data is discarded.

By using a data buffer queuing scheme, a single scan converts the input data stream storing font and resource data in a resource buffer and page data in a page buffer. When the resource buffer is full, the contents are transferred, i.e., downloaded, to the printer. When a complete page of data from the input file has been converted and all the resource buffers have been downloaded to the printer, the queued page buffers are downloaded.

Each page is started as a one-pass process and reverts to a two-pass process only in exceptional cases. By reverting to a two-pass process on a page-by-page basis, one exceptional page does not corrupt the entire conversion process.

This permits an input, e.g., ASCII, data stream to be converted in a single pass if there are sufficient buffers to store all the data to be printed on a page. If insufficient page buffers are available, the conversion is performed using a two-pass process. Therefore, a one-pass process is used where possible, having the advantage of faster conversion, and a two-pass process is used only when necessary because of memory constraints.

BRIEF DESCRIPTION OF THE DRAWING

The invention is described in detail by referring to the various figures which illustrate specific embodiments of the invention and wherein like numerals refer to like elements.

FIG. 1 is a block diagram of a printer control system in which the invention is incorporated.

FIG. 3A is a flowchart of the START_PAGE entry point of the TM2 module.

FIG. 3B is a flowchart of the GET_BUFFER entry point of the TM2 module.

DESCRIPTION OF THE PREFERRED EMBODIMENT

Figure 2:
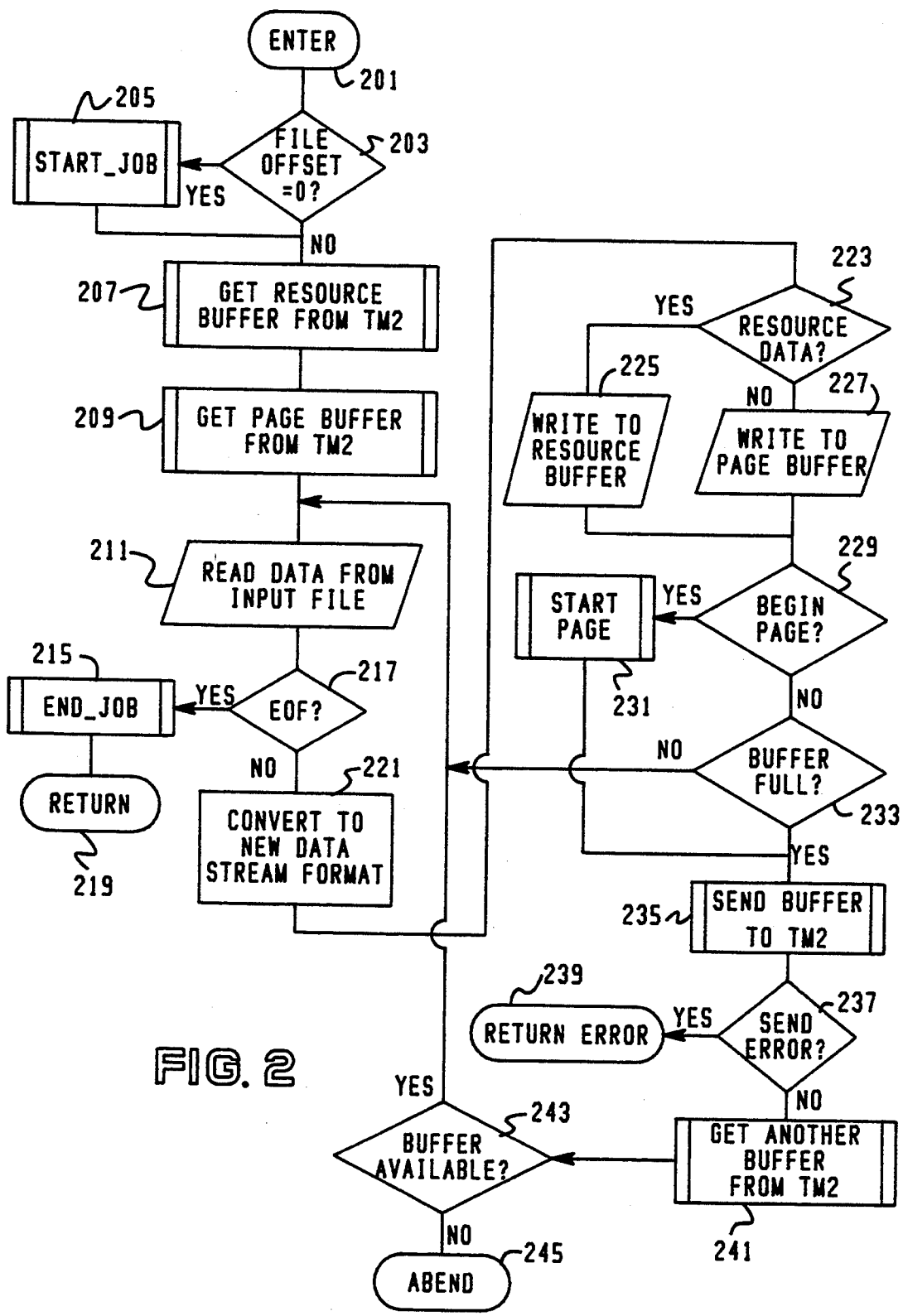
FIG. 2 is a flowchart of a converter program used in conjunction with the invention.

To optimize conversions from one data stream to another, e.g., from ASCII to IPDS, using only one pass through the input file and a second pass if necessary, the invention employs a second traffic manager (TM2) module which incorporates a data buffer queuing scheme. The converter transforms the input data stream to the output data stream, filling buffers with either resource or page data. The resource buffers are downloaded to the printer and page buffers are queued until the end of a page is reached. At this point, all the resource buffers have been transferred to the printer and the page buffer queue can be transferred to the printer.

The converter must be able to perform its function even where insufficient memory is available to queue an entire page. Lack of sufficient memory can be caused by inadequate memory capacity in the processor, which may be a small personal computer, or by a data-intensive page, e.g., a page with large images. In those cases where buffer allocation fails, the queued page buffers are discarded, i.e., recycled, and the TM2 module enters a memory-constrained phase one state. In memory-constrained phase one processing, the TM2 module continues to receive resource and page data to be buffered from the converter. The resource buffers are transferred to the printer as before, but the page buffers are discarded. When the end of a page is reached, the TM2 module effects a return to the converter, which in turn causes the converter to reposition to the beginning of the page and to rescan the entire page. The TM2 module then enters a memory-constrained phase two state.

In memory-constrained phase two processing, the converter transforms the page again, sending buffers to the TM2 module as before. The TM2 module does not, however, download the resource data to the printer since all the resource data was downloaded in memory-constrained phase one. The resource buffers are therefore discarded. During memory-constrained phase two, the page buffers are downloaded to the printer without queuing since the resources have already been downloaded.

At the end of the page, the TM2 module returns to its normal state, queuing page buffers and downloading resource buffers as soon as the latter are full unless the available memory becomes depleted.

A printer driving system according to the invention is shown in FIG. 1. It controls various data object types to be composed on printed pages. Typically, the data stream is encoded in hexadecimal with variable length fields preceded by a control character. Many data stream architectures do not directly supply all the functions required at a sufficiently high level for many applications.

Formatting functions such as paragraphing, column alignment, and variable sized tables are features desirable in printing applications and require varying font metrics. Other desirable features include integrating and manipulating other application data for inclusion and reference to other objects within a document. Another feature is to flow text around image objects to give the appearance of a completely integrated page.

All data stream formats do not encode the above features in the same way and must be converted to a data stream compatible with the target printer. For this reason, printer driving systems include converters. For an IPDS printer, such as described in the patent incorporated by reference, the resource data must be gathered from an input data stream and downloaded to the printer before the page (text and image) data. The resource data, including font data and printer commands, in some data streams, e.g., ASCII, are in-line and scattered throughout the data stream.

In a system such as shown in FIG. 1, files 101 containing the material to be printed are read to a spool interface 103. When the necessary facilities are available, a traffic manager 105 routes the input data stream to a converter 109, commonly performing a two-pass conversion—the first pass extracting and converting the resource data and the second pass converting the page data.

A print manager 111 and a printer driver 115 download the data to a printer 117 from blocks of memory (slots) in a memory 120. These memory slots 121-127 are data buffers in which either resource or page data are stored. Buffers are allocated by a callable module, herein called GET_BUFFER. Memory allocation routines are well known in the art and need no further description.

To avoid two-pass conversion when not necessary, the invention includes a second traffic manager TM2 module 107. The converter 109 operates according to the following pseudocode (using C-like language).

```
converter(input_file, file_offset)
{   if (file_offset == 0) start_job( );
    while (not end of file)
    {   while (not end of page)
        {   (get page buffer from TM2);
            (get resource buffer from TM2);
            (read data from input file which may include
             end of file or end of page);
            (convert to new data stream format);
            if (resource data) (write to resource buffer);
            else (write to page buffer);
            if (buffer full)
            {   (send buffer to TM2);
                if (send error) return (error code);
                (get new buffer from TM2);
                if (buffer not allocated) abend( );
            }
        }
        end_page( );
    }
    (end_job( );
}
```

The converter 109 is not affected by the availability or nonavailability of sufficient memory. In case, however, there is an error in the TM2 module 107 allocating a buffer, which is a different matter, there is an abnormal end. Abnormal ends, or ABENDS, are handled by the calling program.) If a send error is received indicating that the buffer sent to the TM2 module 107 was not correctly received for some reason, the converter 109 returns to the traffic manager 105 for error recovery.

Another implementation of the converter 109 is set forth by a flowchart of FIG. 2. In the following description, references are made to the flowcharts depicting the sequence of operations performed by a software program. The symbols used are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular hardware used to implement the invention. Different processors have different instruction sets; and but persons of ordinary skill in the art are familiar with the instruction sets with which they work and can implement the operations set forth in the blocks of the flowchart.

The converter program module or subroutine is entered at a terminal block 201 and the file offset value is examined at a decision block 203. If the offset is zero, then a START_JOB routine 205 is called which performs several housekeeping tasks such as locating the starting point of the input data stream. Such routines are well known in the art and depend on the file format used.

The converter then obtains a buffer from the TM2 module 107 at a routine (module) block 207 for storing resource data. At a module block 209, the converter obtains a buffer for storing page data. The usual process of allocating a buffer is to pass the number of bytes requested—the size of the requested buffer in bytes—to an operating system routine. The operating system routine returns a pointer that is the address of the reserved location in memory. Most compilers and assemblers have allocation routines built in for reserving a block of memory and returning a pointer to the memory location. (For example, see the malloc( ) module supplied with C and C++ compiler libraries.)

An input/output (I/O) block 211 reads data from the input file. At a decision block 217, an End Of File is sensed for. If present, then a module END_JOB 215 is called and the program is exited at a terminal 219 with no errors indicated. Control is usually then returned to the traffic manager for scheduling the next print job.

If the end of file has not yet been reached, a process block 221 converts the data in the input data stream format to the new or output data stream format. If the input data comprises resource data as determined by a decision block 223, then the converted data is written into the resource buffer by an I/O block 225. Otherwise, it is written into the page buffer by an I/O block 227. Writing to the buffer may merely entail storing the data at the location specified by the memory allocation pointer and incrementing the pointer value.

If the page is finished, as determined by a decision block 229, then a START_PAGE module 231 is invoked from TM2 and the buffer is transferred to the TM2 process block via the process block 235.

If the page is not completed, a decision block 233 determines whether either buffer is full. If not, the process continues at the I/O block 211. If a buffer is filled, then it is transferred to the TM2 module by a module 235. The buffer itself is usually not moved, only the pointer is passed to the TM2 module. If the move is properly completed, an acknowledgement signal is returned to the converter or, if not properly completed, an error signal is returned and sensed by a decision block 237. If an error occurred, the converter is exited at a terminal 239 with an indication of the error, usually identified by number.

If the buffer pointer was correctly passed, the TM2 module returns another buffer pointer via a process block 241. If no buffer pointer is returned as sensed by a decision block 243, the converter process is exited as an abnormal end at a terminal 245. The TM2 module should always return a buffer pointer even when there is no longer sufficient memory. The unavailability of sufficient memory does not affect the converter process but is handled by the TM2 module as set forth in more detail below.

If new buffer pointer is received, the process returns to the I/O block 211 and the conversion of the input data stream continues.

The conversion of characters or groups of characters, e.g., control sequences, performed in the process block 221 need not be covered in detail since it depends on the input and output data stream formats. Such conversions are, however, within the ordinary skill of the art.

So long as buffers are available, the TM2 module 107 operates in the normal mode (phase zero) according to the following pseudocode routine:

```
while (last buffer for present page not received);
{   if (page buffer received)
    {   (queue buffer);
        (allocate page buffer to converter);
        if (buffer allocation fails)
        {   (deallocate all buffers);
            (allocate one buffer);
            (set TM2 state to phase one);
        }
    }
    else if (resource buffer received)
    {   (download buffer to printer);
        (allocate resource buffer to converter);
        if (buffer allocation fails)
        {   (deallocate all buffers);
            (allocate one buffer);
            (set TM2 state to phase one);
        }
    }
}
(download queued page buffers to printer);
```

During phase zero (normal state), the TM2 module queues the page buffers and downloads the resource buffers to the printer immediately. It also allocates buffers to replace the buffers received.

If, however, buffer allocation fails because insufficient memory space is available, the TM2 module shifts to memory-constrained phase one in which it operates according to the following pseudocode until the end of the page is reached.

```
while (not end of page)
{   (dequeue, i.e., deallocate page buffers);
    if (page buffer received)
    {   discard-buffer( );
        (allocate page buffer to converter);
    }
    else if (resource buffer received)
    {   (download resource buffer to printer);
        (allocate resource buffer to converter);
    }
}
(set TM2 state to phase two);
```

In phase one, the TM2 module discards the queued page buffers as received and can merely reallocate the same page buffers until the end of page is reached.

The memory-constrained phase two is invoked by memory-constrained phase one and operates as follows.

```
(restart page to converter);
while (not end of page)
{   if (page buffer received)
    {   (download buffer to printer);
        (allocate buffer to converter);
    }
    else if (resource buffer is received)
    {   (deallocate buffer);
        (allocate resource buffer to converter);
    }
}
```

-continued (set TM2 state to phase zero);

In phase two, the TM2 module first causes the converter to start processing the page from the beginning and then downloads the page buffers immediately to the printer. The resource buffers are not needed and are discarded; the same buffer can be reallocated each time.

In phases one and two, only three buffers are needed, one of which is continuously reallocated. That is the page buffer in phase one and the resource buffer in phase two. The other two buffers are alternately allocated as the contents of the filled buffer are downloaded to the printer.

The memory-constrained phase two returns to phase zero, the normal state which treats the next page as though there were no memory restraints.

In FIG. 3A, the START_PAGE entry point 301 of the TM2 module sets the TM2 module to the normal state (phase zero) at a process block 303 and then returns normally via a terminal 304. That is, each page is started in the single pass mode.

In FIG. 3B the GET_BUFFER entry point 305 allocates a memory buffer by a process block 307. If no error occurs as sensed by a decision block 309, there is a normal return at a terminal 311. If, however, an error is returned, a process block 313 deallocates the queued buffers, i.e., dequeues the page buffers (the resource buffers are not queued) and one buffer is allocated by a process block 314. Next, a process block 315 sets the TM2 module state to phase one. A return via a terminal 317 does not indicate to the converter that there was any error.

Figure 3C:
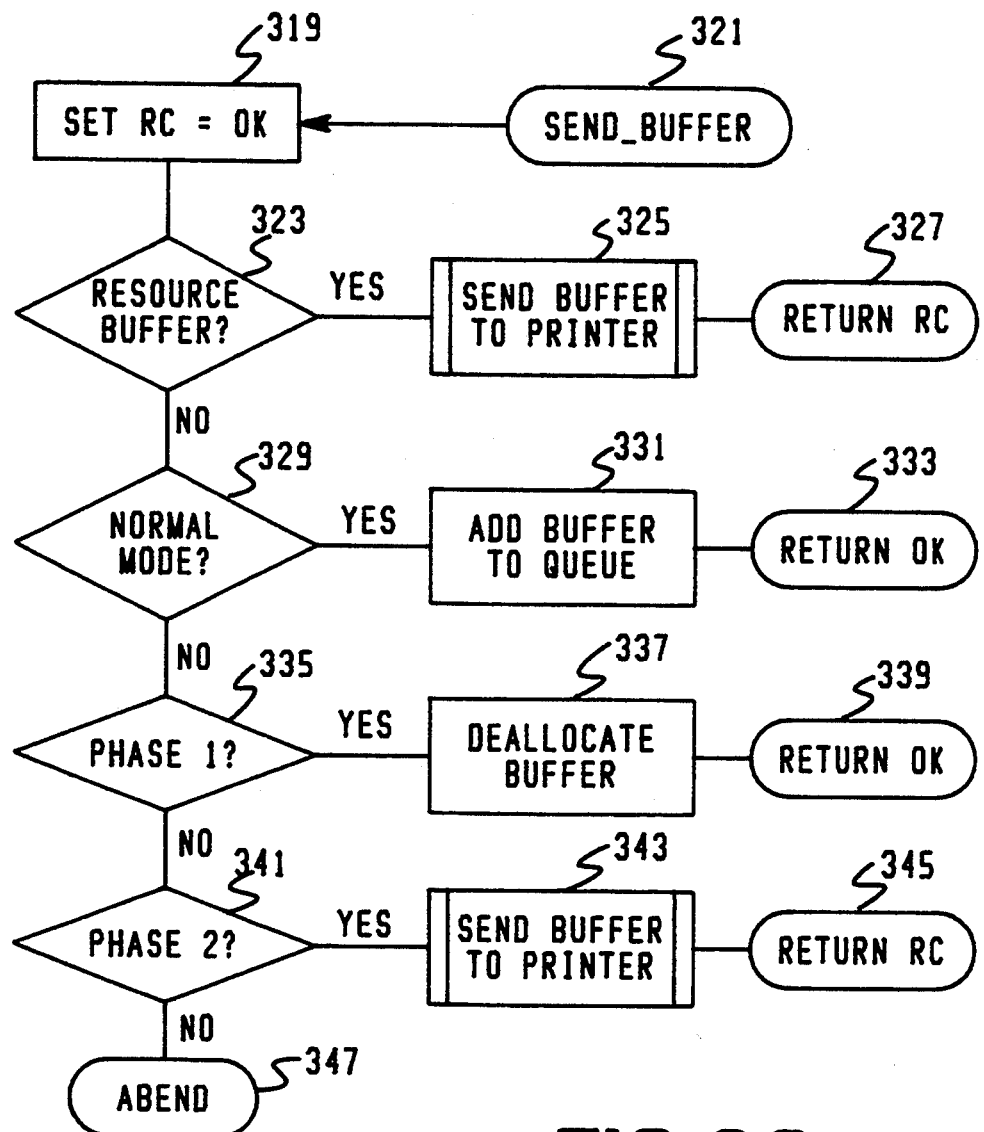
FIG. 3C is a flowchart of the SEND_BUFFER entry point of the TM2 module.

In FIG. 3C, the SEND_BUFFER entry point 321 first sets a return code at a process block 319. The return code is set initially to indicate no error.

If the filled buffer is a resource buffer, detected by a decision block 323, the buffer contents are downloaded to the printer by a routine block 325. If an error signal is returned from the printer, it replaces the return code which is returned by a terminal 327 to invoke error recovery routines. The converter operates as though it is directly coupled to the printer or its driver, i.e., the TM2 module is transparent to the converter. Error recovery routines are common in the application programming art and well known.

If the filled buffer is not a resource buffer, then it is implicitly a page buffer. If in the normal mode as determined by a decision block 329, the buffer is added to the queue by a process block 331 and a normal return is made via a terminal 333.

If not in the normal mode, a test for phase one is made by a decision block 335. If in phase one, the page buffer is deallocated, i.e., discarded in a process block 337 and a normal return 339 is effected.

If not in phase one, a test for phase two is made at a decision block 341. If not in phase two, an abnormal end is effected since if not in the normal mode or phase one, the module should be in phase two. If in fact the module is in phase two, the buffer is downloaded to the printer via a routine block 343 and the return code is returned by a terminal 345.

Figure 3D:
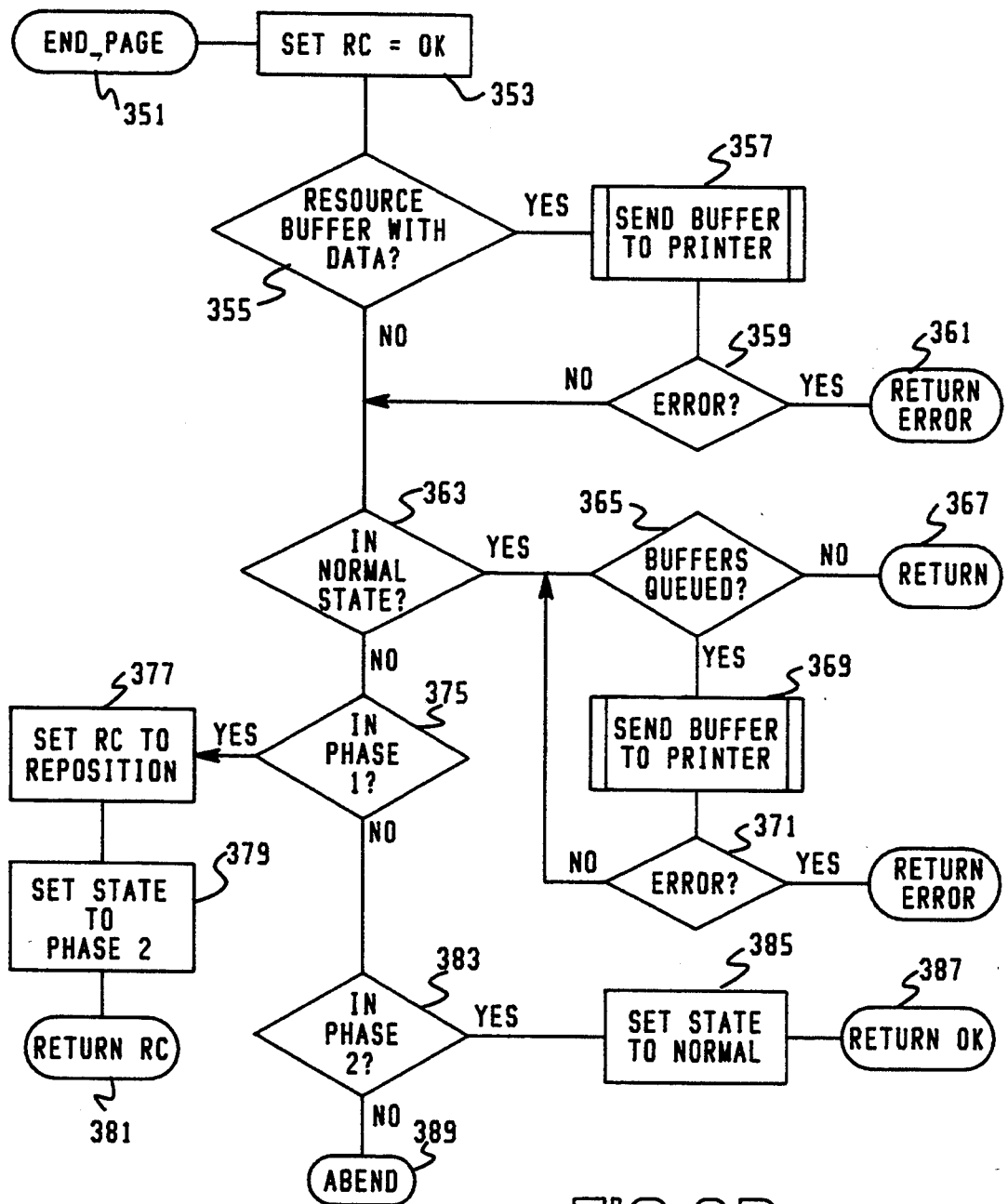
FIG. 3D is a flowchart of the END_PAGE entry point of the TM2 module.

In FIG. 3D, the END_PAGE entry point 351 first sets the return code to no error, e.g., zero. If a resource buffer has data stored in it as determined by a decision block 355, it is downloaded to the printer at a routine block 357. If no error occurs at a decision block 359, the process continues at a decision block 363. Otherwise, the error is returned via a terminal 361 as noted previously.

If in the normal state at the decision block 363, a check is made at a decision block 365 whether any buffers are queued. If so, they are downloaded to the printer via a routine block 369 with error checking at a decision block 371 and error returns at a terminal 373. When downloading is successfully completed, a normal return at a terminal 367 is made.

If not in the normal state (phase zero), then a determination is made at a decision block 375 whether the TM2 module is in phase one. If so, then the return code is set to cause the converter to restart the same page by a process 377. At a process block 379, the state of the TM2 module is set to phase two before returning the return code at a terminal 381.

If not in phase one, a decision block 383 insures the module is in phase two. If not, an abnormal end at a terminal 389 is executed. If so, the module is set to the normal (phase zero) state at a process block 385 and a normal return via a terminal 387 is made.

The method of operation of the invention has been explained to effect a one-pass printer data stream conversion where possible, reverting to two-pass conversion only for those pages where required by a shortage of memory. The programming of the various processes incorporated are within the skill of the art given an explanation of the invention and the teachings of U.S. Pat. No. 4,651,278 incorporated herein by reference.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method of converting a first print data stream in a first format to a second print data stream in a second format for a printer in which printer resource data must be loaded from computer memory prior to page data to be printed including the steps of:
   scanning a page in the first data stream to convert printer resource data and page data to the second format;
   storing converted page data in computer memory;
   transferring converted printer resource data to the printer;
   discarding page data if insufficient computer memory is available to store all the page data to be printed on the page;
   moving page data when scanning a page is completed to the printer from computer memory if sufficient computer memory is available to store all the page data to be printed on the page;
   rescanning the page of the first print data stream if the page data was discarded;
   downloading the page data to the printer during the rescanning; and
   discarding printer resource data encountered during rescanning.

2. The method according to claim 1 wherein the storing page data includes the steps of:
   allocating blocks of memory as page buffers;
   storing page data in the page buffers; and
   queuing the page buffers as filled with page data.

3. The method according to claim 2 wherein the moving step includes the step of transferring the page data from of each page buffer in succession to the printer.

4. The method according to claim 2 wherein the discarding page data step includes the steps of:
   dequeuing all queued page buffers;
   reallocating a single buffer for page storage; and
   disposing of the contents of the single buffer when it is filled.

5. The method of claim 1 wherein the transferring printer resource data step includes the steps of:
   allocating a printer resource buffer in which printer resource data is stored; and downloading the printer resource data to the printer when the resource buffer is filled.

* * * * *